United States Patent [19]
Lindacher et al.

[11] Patent Number: 5,892,214
[45] Date of Patent: Apr. 6, 1999

[54] LOW PROFILE PLANAR SCANNER

[75] Inventors: Joseph M. Lindacher, Duluth; Charles K. Wike, Jr., Sugar Hill, both of Ga.

[73] Assignee: NCR Corporation, Dayton, Ohio

[21] Appl. No.: 752,093

[22] Filed: Nov. 20, 1996

[51] Int. Cl.⁶ .................................................. G06K 7/10
[52] U.S. Cl. ............................................ 235/467; 235/472
[58] Field of Search ..................................... 235/467, 472

[56] References Cited

U.S. PATENT DOCUMENTS

| | | |
|---|---|---|
| 3,520,586 | 7/1970 | Bousky . |
| 4,003,627 | 1/1977 | Wu et al. . |
| 4,057,784 | 11/1977 | Tafoya . |
| 4,108,533 | 8/1978 | Sick et al. . |
| 4,588,887 | 5/1986 | Bailey et al. . |
| 4,652,732 | 3/1987 | Nickl . |
| 4,766,298 | 8/1988 | Meyers . |
| 4,797,551 | 1/1989 | Ferrante . |
| 4,799,164 | 1/1989 | Hellekson . |
| 4,960,985 | 10/1990 | Knowles . |
| 4,967,074 | 10/1990 | von Stein . |
| 5,202,784 | 4/1993 | Reddersen . |
| 5,231,277 | 7/1993 | Aritake et al. . |
| 5,245,170 | 9/1993 | Aritake et al. . |
| 5,268,565 | 12/1993 | Katoh et al. . |
| 5,340,982 | 8/1994 | Nakazawa ............................... 235/467 |
| 5,475,208 | 12/1995 | Marom . |

*Primary Examiner*—Harold Pitts
*Attorney, Agent, or Firm*—Francis L. Conte

[57] ABSTRACT

A bar code scanner includes a window and a rotary spinner mounted therebelow having a plurality of circumferentially adjoining mirrored facets for sweeping light along a scanned arc. A light source projects a scan beam on the spinner, and a plurality of pattern mirrors are optically aligned with the spinner along the scanned arc in a forward path for diverting the scan beam outwardly through the window to a bar code for effecting a scattered beam therefrom. A collection mirror is optically aligned with the spinner along the scanned arc for receiving the scattered beam in a return path from the pattern mirrors and spinner in turn. A detector is optically aligned with the collection mirror for receiving the scattered beam, and a decoder is provided for decoding the scattered beam.

15 Claims, 5 Drawing Sheets

LOW PROFILE PLANAR SCANNER

BACKGROUND OF THE INVENTION

The present invention relates generally to bar code scanners, and, more specifically, to low profile scanners.

In a typical bar code scanner, a laser scan beam traverses a bar code having a sequence of varying width dark bars and white spaces and scatters back into the scanner. A common bar code uses the conventional Uniform Product Code (UPC) convention for encoding data therein. For example, in a merchandising point-of-sale facility, the UPC bar code encodes product description and price information which is read by the scanner at a checkout counter for totaling the cost of merchandise being purchased by a customer.

A typical omni-directional bar code scanner projects a laser beam on a rotating multi-faceted spinner which scans the beam across several pattern mirrors for creating corresponding scan lines which are projected out through a scan aperture or window toward the bar code being manually swiped thereacross. The bars and spaces of the bar code differently scatter light in a return path through the pattern mirrors to the spinner from which it is intercepted by a collection mirror and focused on a photodetector. The photodetector's signal is conditioned, digitized, and decoded in suitable decoding electronics to decode the scattered light for reading the data contained in the bar code.

The various pattern and collection mirrors typically found in a bar code scanner are suitably aligned therein for performing their separate functions and are typically located in different vertical planes which necessarily increases the overall depth or height of the scanner.

In one type of checkout counter, the scanner is mounted in the top of a counter in the form of a table which provides access thereunder for accommodating the legs and knees of an operator in a sitting position. However, conventional scanners cannot be made substantially shallow in depth in view of the required optical paths therethrough for the scan and scattered beams.

Accordingly, it is desirable to have a shallow bar code scanner for reducing the overall thickness of a table checkout counter for providing suitable ergonomics for the operator.

SUMMARY OF THE INVENTION

A bar code scanner includes a window and a rotary spinner mounted therebelow having a plurality of circumferentially adjoining mirrored facets for sweeping light along a scanned arc. A light source projects a scan beam on the spinner, and a plurality of pattern mirrors are optically aligned with the spinner along the scanned arc in a forward path for diverting the scan beam outwardly through the window to a bar code for effecting a scattered beam therefrom. A collection mirror is optically aligned with the spinner along the scanned arc for receiving the scattered beam in a return path from the pattern mirrors and spinner in turn. A detector is optically aligned with the collection mirror for receiving the scattered beam, and a decoder is provided for decoding the scattered beam.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
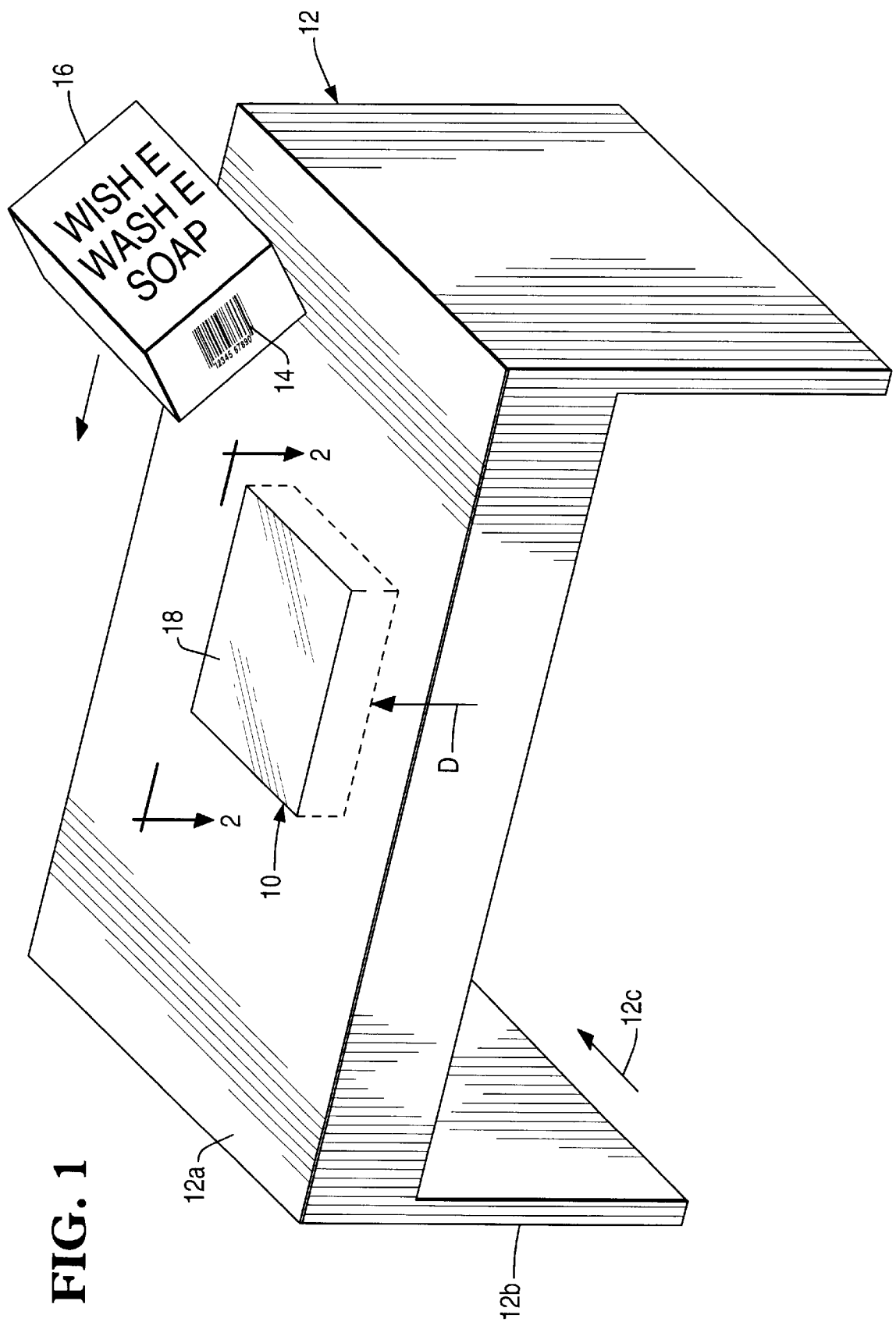
FIG. 1 is an exemplary embodiment of a low profile scanner mounted in a table checkout counter for scanning a bar code on a merchandise item.

Illustrated in FIG. 1 is a bar code scanner 10 in accordance with an exemplary embodiment of the present invention mounted in the top of a checkout counter 12 in the form of a table. The counter 12 has a top horizontal surface 12a, and sits atop legs 12b for providing a knee hole 12c thereunder for the legs and knees of a sitting operator or clerk. The counter 12 may be used for example in a merchandising point-of-sale store for reading conventional bar codes 14 found on a corresponding label of a merchandise item 16. The bar code 14 may take any conventional form, such as the Uniform Product Code (UPC) having a plurality of dark bars and white spaces of varying width for encoding information therein.

The bar code scanner 10 illustrated in FIG. 1 has a substantially low depth or profile measured by its vertical depth D, and is mounted with its upper surface, defined by a scan aperture or window 18, flush to the table top 12a. The depth D of the scanner 10 may be as little as about 3 centimeters in height which thereby ensures that the height or depth of the table top is relatively small for maximizing the height of the table knee hole 12c for the operator.

Figure 2:
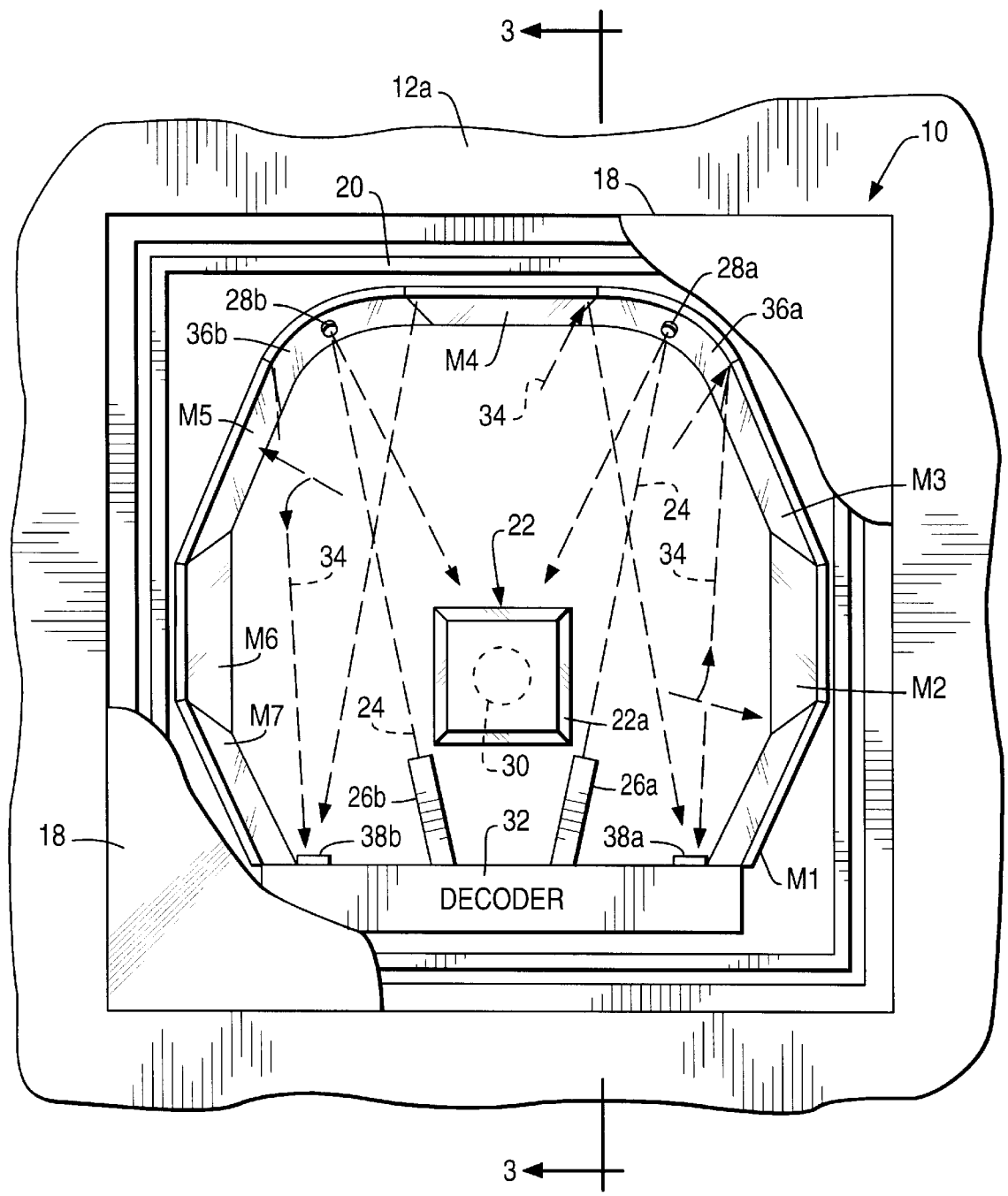
FIG. 2 is a top schematic view of the bar code scanner illustrated in FIG. 1 and taken along line 2—2.
Figure 3:
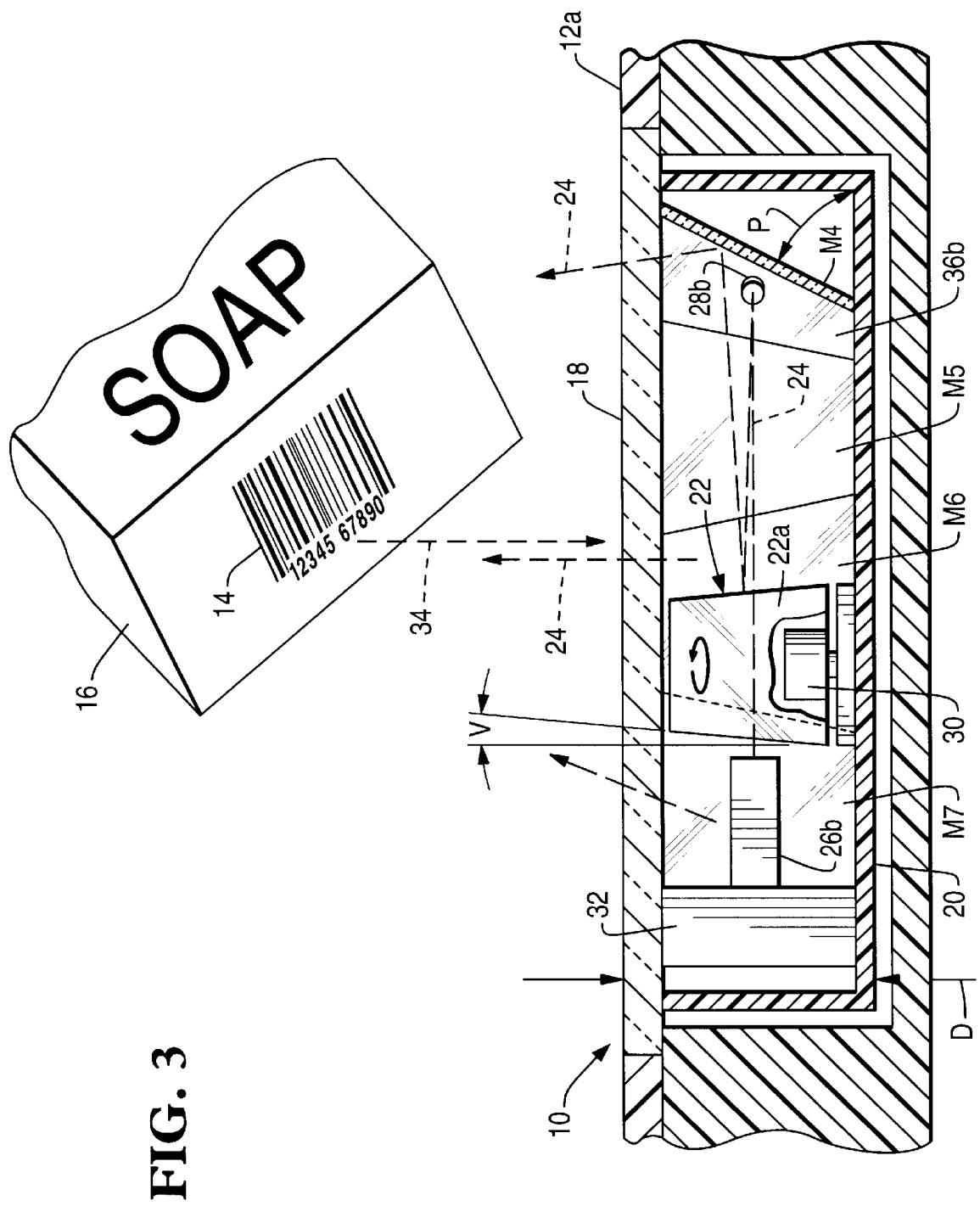
FIG. 3 is a partly sectional, elevational view of the bar code scanner illustrated in FIG. 2 and taken along line 3—3.

The scanner 10 is illustrated in more particularity in FIGS. 2 and 3 and includes a suitable housing 20 mounted in a corresponding recess or well in the table top 12a. The scanner 10 includes a conventional rotary spinner 22 suitably mounted in the housing 20 below the window 18, and having a plurality of circumferentially adjoining mirrored facets 22a for reflecting or sweeping light. The individual facets 22a are typically flat mirrors for reflecting light, and any suitable number of facets 22a may be used such as three, four, or five for example, with a four facet spinner 22 being shown for example.

Suitable means are provided for projecting a scan light beam 24 onto the facets of the spinner 22 as it turns. In the preferred embodiment illustrated, two conventional light sources 26a and 26b are provided in conjunction with corresponding first and second deflection mirrors 28a and 28b which are optically aligned between the spinner 22 and respective ones of the light sources 26a,b. Each deflection mirror 28a,b thereby reflects light from the respective source 26a,b to the spinner 22 for effecting separate scan beams 24. The light sources 26a,b may take any conventional form, such as laser light emitting diodes, and the deflection mirrors 28a,b may take any conventional form such as small flat deflection mirrors.

Suitable means are provided for rotating the spinner 22, and may take any conventional form such as an electrical motor 30 mounted inside the spinner 22 for rotating it in the exemplary counterclockwise direction illustrated in FIG. 2. The motor 30 and light sources 26a,b are conventionally operated together. A conventional decoder 32 is provided for suitably decoding the scattered beam 34 from the bar code 14. The decoder 32 may take any conventional form including a microprocessor, digitizer, and decoding electronics, but is configured in accordance with the present invention with a suitably shallow height or depth for fitting within the low profile of the scanner 10.

The decoder 32 preferably includes a narrow printed circuit board along the back of the scanner 10 to which the light sources 26a,b are operatively attached. During operation, the light sources 26a,b emit light which is reflected from the mirrors 28a,b to intercept the rotating spinner 22. As the spinner 22 rotates, each of the facets 22a receives the incident light beam 24 in turn and reflects it radially outwardly along a respective scanned arc in a conventional manner. The effective scanned arc for a spinner facet is conventionally determined by dividing 720° by the number of facets, which in this case results in a scanned arc of 180° for each facet 22a.

A plurality of first or primary pattern mirrors M1 through M7 are optically aligned with the spinner 22 along both scanned arcs generated by the separate light sources 26a,b in a forward path for diverting the respective scan beams 24 outwardly through the window 18 to the bar code 14 for effecting a scattered light beam 34 therefrom. All of the pattern mirrors may take any conventional form and are typically flat reflection mirrors suitably oriented for effecting different scan lines as the scan beam 24 traverses thereover.

The pattern mirrors M1–7 are preferably aligned around the circumference of the spinner 22 as described in more detail hereinbelow for diverting the separate scan beams 24 outwardly through the window 18 for generating respective scan lines across the bar code 14 in a collective scan pattern shown in an exemplary configuration in FIG. 4. As each spinner facet 22a rotates within its 180° scanned arc, the scanned beam 24 traverses in sequence corresponding ones of the several pattern mirrors M1–7 for creating in turn corresponding scan lines.

As illustrated in more particularity in FIG. 3, each of the spinner facets 22a is preferably inclined from the vertical at a different inclination angle V for correspondingly increasing the number of scan lines. If all the facets 22a have the same angular inclination, all four facets would merely produce four identical sets of scan lines. By differently inclining each of the facets 22a at slightly different angular orientations as is conventionally known, each of the four facets will effect a different set of scan lines from the pattern mirrors, and therefore produce four sets of generally parallel scan lines to increase the coverage of the scan pattern.

Figure 4:
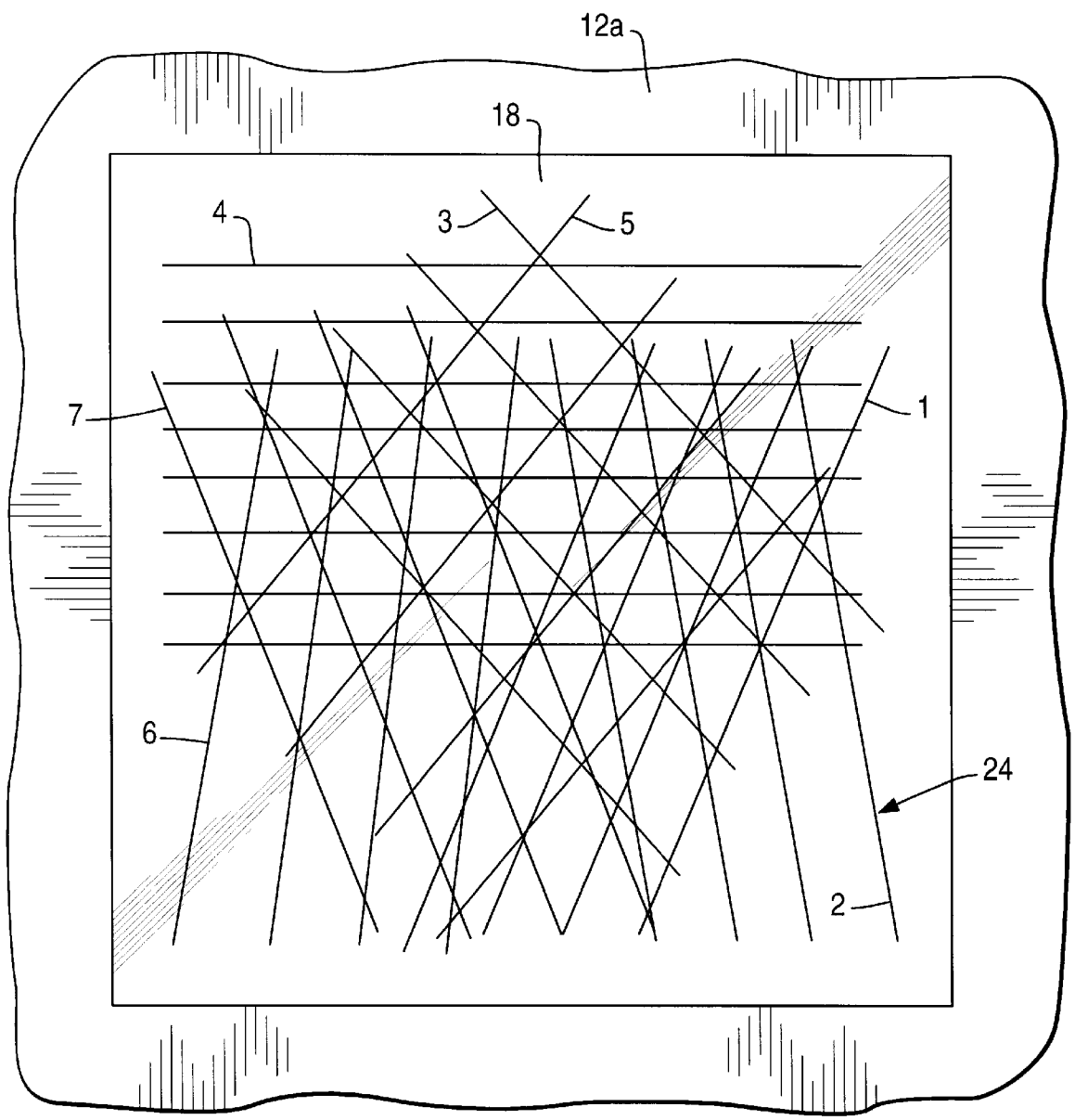
FIG. 4 is a top view of the scan window illustrated in FIG. 1 showing an exemplary scan pattern formed therein for scanning the bar code.

The exemplary pattern of scan lines illustrated in FIG. 4 is projected outwardly through the window 18 and against the bar code 14 as it is traversed over the window 18, with light being scattered from the bar code 14 in varying intensity from the bars and spaces thereof. The scattered light beam 34 therefore is encoded with the information from the bar code 14 and requires suitable decoding, which is conventionally accomplished using the decoder 32.

Accordingly, the scattered beam 34 follows a return path which is generally similar to the forward path since it first reflects from the corresponding pattern mirror back to the spinner facet 22a, and in the general direction of the deflection mirrors 28a,b. In a conventional bar code scanner, the return or collection light path must diverge away from the forward scan path to avoid obstruction of the forward path along the pattern mirrors which would correspondingly remove portions of the overall scan pattern.

However, in accordance with the present invention, corresponding first and second collection mirrors 36a and 36b are optically aligned with the spinner 22 along the respective scanned arcs for receiving the scattered beam 34 in the return path from the pattern mirrors and spinner 22 in turn. As best shown in FIG. 3, the collection mirrors 36a,b are located in the same plane as the scanned arcs of the scan beam 24 from the spinner 22 and therefore necessarily block a portion of the scanned arc as it traverses the pattern mirrors M1–7 in turn.

As shown in FIG. 2, the spinner 22 rotates counterclockwise for rotating each of the scan beams 24 reflected therefrom in counterclockwise rotating scanned arcs of 180°. The scan beam 24 from the right light source 26a reflects from the spinner 22 over a 180° arc generally along the right side of the spinner 22. The scan beam 24 from the left light source 26b reflects from the spinner 22 along a 180° scan arc generally along the left side of the spinner 22. And, collectively, the two scan beams sweep across the first through seventh pattern mirrors M1–M7 in sequence.

The collection mirrors 36a,b may take any conventional form such as ellipsoid mirrors which focus the scattered beam 34, with or without focusing lenses, on corresponding first and second photodetectors 38a,b optically aligned with the corresponding collection mirror 36a,b. The detectors 38a,b may take any conventional form such as photodiodes which may be operatively joined to the narrow printed circuit board of the decoder 32. The scattered beam 34 detected by the detectors 38a,b is conventionally decoded in the decoder 32 for deciphering the data stored in the bar code 14, such as item description and price, for example.

As shown in FIGS. 2 and 3, by overlaying the collection mirrors 36a,b of the return or collection path over a small portion of the forward or scan path, the overall scanner 10 may be collapsed in depth D for effecting a relatively shallow or low profile scanner having a thickness down to about 3 centimeters. However, as indicated above, this benefit is at the expense of obstructing a portion of the scanned arcs created by inserting the collection mirrors 36a,b in their optical paths. As shown in FIG. 2, each of the collection mirrors 36a,b has a circumferential extent of about 25° along the path of the scanned arc which therefore removes those respective 25° portions from the entire 180° scanned arc for each of the light sources 26a,b.

As also shown in FIG. 2, the pattern mirrors M1–7 are preferably arranged in a sequence in a counterclockwise fashion around the circumference of the spinner 22 and along the respective scanned arcs. Each of the collection mirrors 36a,b is preferably circumferentially interposed between adjacent pairs of the pattern mirrors M1–7 to spatially interrupt the scan beams along the scanned arcs.

The pattern mirrors M1–7 illustrated in FIG. 2 are preferably arranged in first and second sets symmetrically on opposite left and right sides of the spinner 22 for diverting the respective scanned beams through the window 18 in sequence along the scanned arcs. An exemplary first set of pattern mirrors includes M1, M2, M3, and M4; and an exemplary second set of pattern mirrors includes M4, M5, M6, and M7, with the fourth pattern mirror M4 being common to both sets.

In the exemplary embodiment illustrated in FIG. 2, the scanned arcs from the spinner 22 separately produced by the first and second light sources 26a,b overlap each other at least across the common pattern mirror M4 disposed symmetrically therebetween. The first and second pattern mirror sets are preferably disposed symmetrically on left and right diametrically opposite sides of the spinner 22 for producing a substantially symmetrical scan beam pattern. Each of the pattern mirrors M1–7 is differently oriented for diverting the scan beams 24 through the window 18 in a respectively different scan line collectively forming the scan pattern illustrated in one embodiment in FIG. 4.

Since the bar code 14 illustrated in FIG. 3 may be traversed across the window 18 in various orientations, it is desirable to create the scan beam pattern with several intersecting and parallel scan lines to ensure that at least one scan line is effective for fully traversing the bar code 14 for increasing the likelihood of a successful read thereof. The pattern mirrors M1–7 illustrated in FIG. 2 are therefore collectively arranged to effect sets of scan lines running orthogonally to each other, as well as diagonally therebetween to effectively form a pattern of generally straight lines radiating radially outwardly in a generally star pattern.

In the exemplary embodiment illustrated in FIG. 2, the three pattern mirrors M1–M3 are circumferentially contiguous in a concave arrangement relative to the right side of the spinner 22. Corresponding symmetrically with the first three pattern mirrors M1–M3 are the last three pattern mirrors M7, M6, and M5, respectively. These mirrors M5–7 are also disposed circumferentially contiguously with each other in a concave arrangement relative to the left side of the spinner 22, and diametrically opposite from the first three pattern mirrors M1–3.

As indicated above, the first and second collection mirrors 36a,b are disposed in respective ones of the pattern mirrors sets and are preferably circumferentially contiguous with the third pattern mirror M3 and the fifth pattern mirror M5, respectively. And, the fourth pattern mirror M4 is common to both sets and is disposed circumferentially contiguously between the first and second collection mirrors 36a,b.

The first and second deflection mirrors 28a,b are preferably mounted near the centers of the respective first and second collection mirrors 36a,b, and may be suitably mounted therein or thereon. And, the respective deflection mirrors 28a,b and light sources 26a,b are preferably disposed on opposite sides of the spinner 22, suitably spaced therefrom in a compact and symmetrical arrangement therearound as shown in FIG. 2. The decoder 32 and light sources 26a,b attached thereto are therefore mounted on the backside of the scanner 10 to face the clerk, with the common fourth pattern mirror M4 and collection mirrors 36a,b being mounted on the front side of the scanner 10. The remaining pattern mirrors M1–3 and M5–7 are symmetrically mounted on diametrically opposite left and right sides of the scanner 10.

As shown in FIG. 2, the first and second deflection mirrors 28a,b are therefore optically aligned with the spinner 22 at different but symmetrical angles relative thereto to collectively expand the overall scanned arc in degrees, and thereby with the two sets of pattern mirrors expand the entire scanned pattern and its attendant coverage. The individual 180° scanned arcs therefore suitably overlap across at least the common fourth pattern mirror M4, and provide an overall scan of about 240° from about 4 o'clock to 8 o'clock in a clock position reference.

As indicated above, each of the spinner facets 22a is inclined at a different angle, with the four facets 22a correspondingly traversing slightly differently inclined scanned arcs along the pattern mirrors M1–7 in turn. Since two light sources 26a,b and two sets of pattern mirrors are used in the preferred embodiment illustrated in FIG. 2, some circumferential overlap in scan line and scan pattern occur.

FIG. 4 illustrates eight sets of intersecting groups of four scan lines over the extent of the window 18 effected from the two scanned beams 24 traversing their corresponding scanned arcs over their respective pattern mirrors. The right scan beam 24 from the right light source 26a illustrated in FIG. 2 traverses in turn pattern mirrors M1–M4 of the first set. And, the left scan beam 24 from the left light source 26b traverses in turn pattern mirrors M4–M7 of the second set. Although the fourth pattern mirror M4 is common to the two mirror sets, the different incident angles on the spinner 22 provided by the two light sources 26a,b effect slightly different scan lines from the fourth pattern mirror M4.

Since the collection mirrors 36a,b as shown in FIG. 2 are in the same plane as the respective scan beams 24, they spatially interrupt the scan beam temporarily between the third pattern mirror M3 and the fourth pattern mirror M4, and between the fourth pattern mirror M4 and the fifth pattern mirror M5. This lapse in pattern generation between these adjacent pattern mirrors circumferentially separated by the corresponding collection mirrors 36a,b correspondingly eliminates scan lines therebetween which could otherwise be formed with additional pattern mirror coverage.

However, the scan lines created by the pattern mirrors may be suitably positioned within the overall scan pattern in the window 18 for decreasing the adverse affect thereof. Since each individual pattern mirror M1–M7 is separately oriented in space, they may be individually adjusted for more uniformly covering the window 18 with intersecting scan lines therefrom for increasing the likelihood of a good bar code read as the bar code 14 is traversed across the window 18. Although the collection mirrors 36a,b interrupt the sequence of pattern mirrors, the directly affected pattern mirrors M3 and M4, and M4 and M5 may be suitably oriented so that the scan lines produced therefrom are suitably positioned in the overall scan pattern for obtaining the desired coverage.

Figure 5:
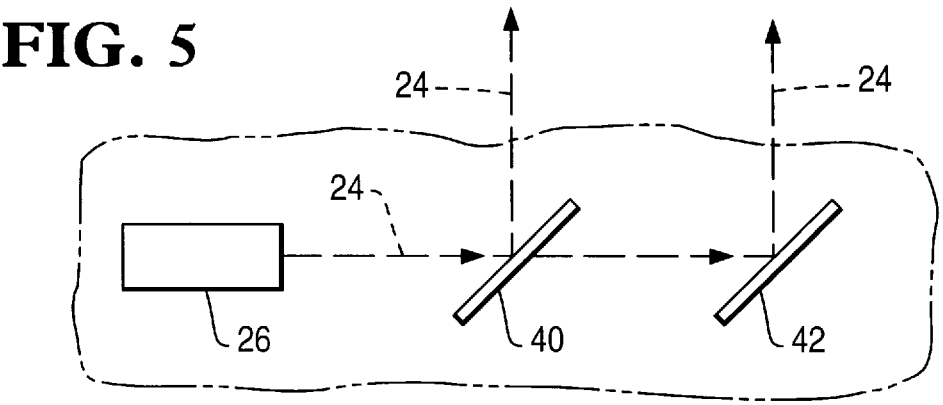
FIG. 5 is a schematic representation of an alternate embodiment of a single light source for the scanner illustrated in FIG. 2 using a beam splitter for forming two scan beams therein.

In the exemplary embodiment illustrated in FIG. 2, two separate light sources 26a,b are used and are optically aligned with respective ones of the deflection mirrors 28a,b. In an alternate embodiment of the invention illustrated in FIG. 5, a single light source 26 may be used in conjunction with a conventional beam splitter 40 which reflects a portion of the beam 24 to one of the deflection mirrors 28a,b, and transmits a portion of the beam 24 to a conventional relay mirror 42 which reflects this portion of the beam 24 to the other one of the deflection mirrors 28a,b. Accordingly, a single light source 26 may be optically aligned with both deflection mirrors 28a,b if desired.

Figure 6:
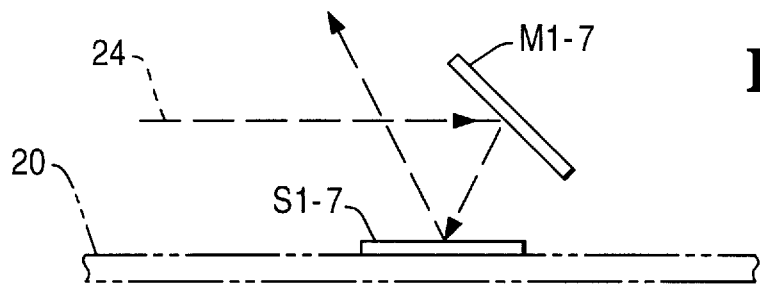
FIG. 6 is a schematic representation of an alternate embodiment of one of the pattern mirrors illustrated in FIG. 2 oriented for use with a secondary pattern mirror mounted on the floor of the scanner for diverting the scan beam upwardly.

In the exemplary embodiment illustrated in FIGS. 2 and 3, the pattern mirrors M1–7 have a suitable acute inclination angle P from the horizontal away from the incident scan beam 24 for directly diverting the scan beam 24 through the window 18 towards the bar code 14 without the need for additional intervening mirrors therebetween. In FIG. 6, the primary pattern mirrors M1–7 are inclined at an acute angle toward the incident scan beam 24 for firstly deflecting the scan beam downwardly toward the floor of the housing 20 on which are suitably secured a corresponding plurality of second or secondary pattern mirrors S1 through S7 which are optically aligned with the primary mirrors M1–7 for indirectly reflecting the scan lines or beams from the primary mirrors M1–7 and through the window 18.

Figure 7:
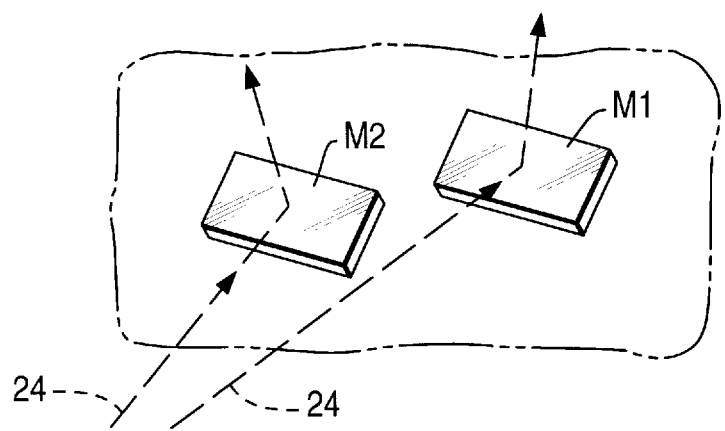
FIG. 7 is a perspective view of two adjacent pattern mirrors of the scanner illustrated in FIG. 2 having offset therebetween in accordance with another embodiment of the present invention.

In the preferred embodiment illustrated in FIG. 2, the adjoining pattern mirrors M1–3 and M5–7 are preferably tangent to each other. And, in an alternate embodiment illustrated in FIG. 7, with the first and second pattern mirrors M1 and M2 being illustrated for example, the adjoining mirrors may be suitably offset from each other for further affecting the location of individual scan lines in the overall pattern if desired.

As indicated above, positioning the collection mirrors 36a,b in substantially the same plane as the scanned arcs from the spinner 22 and the several pattern mirrors M1–7 allows a substantial reduction in height or profile of the scanner 10, at the compromise of the corresponding loss in the overall extent of the scan lines. Nevertheless, this improved scanner 10 allows a relatively small scanner depth for still achieving the performance of a substantially deeper scanner wherein the collection optics are vertically separated from the pattern mirrors.

Although two light sources, collection mirrors, photo detectors, and pattern mirror sets are disclosed in the preferred embodiment, single ones thereof may also be used depending upon the overall scan pattern desired. The length and width of the overall scan pattern in the scan window 18 using the present invention may be on the order of about 20 centimeters which provides substantial scanning coverage in a shallow profile scanner.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A scanner for reading a bar code comprising:

a window;

a rotary spinner mounted below said window and having a plurality of circumferentially adjoining mirrored facets for sweeping light along a scanned arc;

means for projecting a scan beam on said spinner;

a plurality of pattern mirrors optically aligned with said spinner along said scanned arc in a forward path for diverting said scan beam outwardly through said window to said bar code for effecting a scattered beam therefrom;

a collection mirror optically aligned with said spinner along said scanned arc for receiving said scattered beam in a return path from said pattern mirrors and spinner in turn;

a detector optically aligned with said collection mirror for receiving said scattered beam; and a decoder operatively joined to said detector for decoding said scattered beam.

2. A scanner according to claim 1 wherein:

said pattern mirrors are arranged in a sequence along said scanned arc; and said collection mirror is interposed between an adjacent pair of said pattern mirrors to spatially interrupt said scan beam along said scanned arc.

3. A scanner according to claim 2 wherein said projecting means comprise a light source, and a deflection mirror optically aligned between said spinner and said light source for reflecting light from said source to said spinner for effecting said scan beam.

4. A scanner according to claim 3 wherein said deflection mirror is mounted in said collection mirror.

5. A scanner according to claim 4 wherein said deflection mirror and light source are disposed on opposite sides of said spinner.

6. A scanner according to claim 4 further comprising:

first and second sets of said pattern mirrors disposed on opposite sides of said spinner for diverting said scan beam through said window in sequence along said scanned arc;

first and second collection mirrors disposed in respective ones of said pattern mirror sets; and first and second deflection mirrors mounted in respective ones of said first and second collection mirrors.

7. A scanner according to claim 6 wherein said pattern mirror sets and include a common pattern mirror disposed symmetrically therebetween, with each of said pattern mirrors being differently oriented for diverting said scan beam through said window in a respectively different scan line collectively forming a scan pattern.

8. A scanner according to claim 7 wherein said first and second deflection mirrors are optically aligned with said spinner at different incident angles to collectively expand said scanned arc and expand said scan pattern.

9. A scanner according to claim 8 wherein each of said spinner facets is inclined at a different angle for correspondingly forming different scan lines.

10. A scanner according to claim 9 further comprising two of said light sources optically aligned with respective ones of said deflection mirrors.

11. A scanner according to claim 9 further comprising a single light source optically aligned with both said deflection mirrors.

12. A scanner according to claim 9 wherein said pattern mirrors directly divert said scan beam through said window.

13. A scanner according to claim 9 wherein said pattern mirrors comprise primary mirrors, and further comprising secondary pattern mirrors optically aligned with said primary mirrors for indirectly reflecting said scan lines from said primary mirrors and through said window.

14. A scanner according to claim 9 wherein adjoining ones of said pattern mirrors are tangent to each other.

15. A scanner according to claim 9 wherein adjoining ones of said pattern mirrors are offset from each other.

* * * * *